(12) United States Patent
Dimitrova et al.

(10) Patent No.: US 8,949,878 B2
(45) Date of Patent: Feb. 3, 2015

(54) SYSTEM FOR PARENTAL CONTROL IN VIDEO PROGRAMS BASED ON MULTIMEDIA CONTENT INFORMATION

(75) Inventors: Nevenka Dimitrova, Yorktown Heights, NY (US); Radu Jasinschi, Ossining, NY (US)

(73) Assignee: Funai Electric Co., Ltd., Osaka (JP)

(*) Notice: Subject to any disclaimer, the term of this patent is extended or adjusted under 35 U.S.C. 154(b) by 4372 days.

(21) Appl. No.: 09/822,436

(22) Filed: Mar. 30, 2001

(65) Prior Publication Data
US 2002/0147782 A1    Oct. 10, 2002

(51) Int. Cl.
H04N 7/16       (2011.01)
H04N 21/466     (2011.01)
H04N 21/439     (2011.01)
H04N 21/44      (2011.01)
H04N 21/454     (2011.01)
H04N 21/475     (2011.01)

(52) U.S. Cl.
CPC ............. *H04N 21/466* (2013.01); *H04N 7/163* (2013.01); *H04N 21/4394* (2013.01); *H04N 21/44008* (2013.01); *H04N 21/4542* (2013.01); *H04N 21/4755* (2013.01)
USPC .......................................... 725/28; 709/229

(58) Field of Classification Search
CPC ........................ H04N 7/163; H04N 21/4532
USPC ........................ 725/25–31; 709/229
See application file for complete search history.

(56) References Cited

U.S. PATENT DOCUMENTS

| | | | |
|---|---|---|---|
| 4,639,779 A | 1/1987 | Greenberg | 358/142 |
| 4,843,562 A | 6/1989 | Kenyon et al. | 364/604 |
| 4,930,158 A | 5/1990 | Vogel | 380/5 |
| 4,930,160 A | 5/1990 | Vogel | 380/23 |
| 5,195,135 A | 3/1993 | Palmer | |
| 5,485,518 A | 1/1996 | Hunter et al. | |
| 5,561,457 A | 10/1996 | Cragun et al. | |

(Continued)

FOREIGN PATENT DOCUMENTS

| | | | |
|---|---|---|---|
| EP | 0952734 A2 | 10/1999 | |
| JP | 08180418 A | 7/1996 | G11B 7/00 |
| WO | WO98/52357 | 11/1998 | |

OTHER PUBLICATIONS

S. Jeannin et al, "Motion Descriptors for Content-Based Video Representation", Signal Processing: Image Communication, vol. 16, pp. 59-85, 2000.

(Continued)

*Primary Examiner* — Annan Shang
(74) *Attorney, Agent, or Firm* — Cooper & Dunham LLP

(57) ABSTRACT

A parental control system provides the ability to automatically filter a multimedia program content in real time based on stock and user specified criteria. The criteria are used to teach a learning module in the system what types of video program segments are to be considered sensitive or objectionable so that the module's understanding of what is sensitive and what is not can be applied to other video programs to provide real-time filtering. The multimedia program is broken down into audio, video, and transcript components so that sound effects, visual components and objects, and language can all be analyzed collectively to make a determination of whether offending material is being passed along in the multimedia program. The user has the option of training the system for any type of objectionable material, not just sex and violence.

50 Claims, 3 Drawing Sheets

(56) References Cited

U.S. PATENT DOCUMENTS

| | | | |
|---|---|---|---|
| 5,614,940 A | 3/1997 | Cobbley et al. | |
| 5,684,918 A * | 11/1997 | Abecassis | 386/349 |
| 5,809,471 A | 9/1998 | Brodsky | 704/275 |
| 5,818,510 A | 10/1998 | Cobbley et al. | |
| 5,828,402 A * | 10/1998 | Collings | 725/28 |
| 5,854,856 A | 12/1998 | Moura et al. | 382/232 |
| 5,911,043 A * | 6/1999 | Duffy et al. | 709/203 |
| 5,973,683 A * | 10/1999 | Cragun et al. | 715/719 |
| 6,075,550 A | 6/2000 | Lapierre | |
| 6,100,941 A | 8/2000 | Dimitrova et al. | 348/700 |
| 6,115,057 A * | 9/2000 | Kwoh et al. | 725/28 |
| 6,137,544 A | 10/2000 | Demitrova et al. | 348/700 |
| 6,144,401 A * | 11/2000 | Casement et al. | 725/30 |
| 6,166,728 A | 12/2000 | Haman et al. | 715/719 |
| 6,177,931 B1 * | 1/2001 | Alexander et al. | 725/52 |
| 6,185,363 B1 | 2/2001 | Demitrova et al. | 386/69 |
| 6,321,381 B1 * | 11/2001 | Yuen et al. | 725/28 |
| 6,529,526 B1 * | 3/2003 | Schneidewend | 370/486 |
| 6,684,240 B1 * | 1/2004 | Goddard | 709/217 |
| 6,829,582 B1 * | 12/2004 | Barsness | 704/275 |
| 7,673,320 B2 * | 3/2010 | Abe et al. | 725/110 |
| 2001/0001159 A1 | 5/2001 | Ford | |
| 2002/0042920 A1 * | 4/2002 | Thomas et al. | 725/87 |
| 2002/0122137 A1 | 9/2002 | Chen et al. | |

OTHER PUBLICATIONS

International Search Report dated Jun. 12, 2003 in corresponding European patent application No. 02 70 5010.3.

European Office Action dated Oct. 14, 2013 in corresponding European patent application No. 02 70 5010.3.

* cited by examiner

SYSTEM FOR PARENTAL CONTROL IN VIDEO PROGRAMS BASED ON MULTIMEDIA CONTENT INFORMATION

BACKGROUND OF THE INVENTION

1. Field of the Invention

The current invention relates to parental control systems for entertainment systems. More specifically, the present invention relates to parental control systems for dynamically filtering the content of a video program in real time on a segment by segment basis, based on at least one user-supplied category of filtering criteria. Methods for dynamically filtering the content of a video program in real time on a segment by segment basis ate also disclosed.

2. Discussion of Related Art

In current television and video programs the rating of such programs is based on subjective program content evaluation generated by human observation, i.e., based on some sort of interpreted standard for classification. The result of this content evaluation is a set of recommendations, such as ratings. Examples include ratings of G, PG, PG-13, R, NC17, X for movies, or TV-Y, TV-Y7, TV-G, TV-PG, TV-14, and TV-MA for television programs. Such ratings are typically shown at the beginning of a video program, perhaps with an additional set of sub-classifications, such as "V" for violence, "AL" for adult language, and "N" for nudity, for example.

One of the limitations of this process, i.e., subjective evaluation, is that it does not provide a comprehensive set of criteria for parents to judge the appropriateness, or lack thereof, of TV programs. For example, the Motion Picture Association of America (MPAA) describes a PG rating for movies as referring to a film which a parent should view or at least get more detailed information on before letting their children watch the movie. The MPAA further states that PG movies may contain some profanity, some violence, and/or some brief nudity—in some combination possibly, but no drug use. Such a description is very vague and uncertain, and does not provide enough detail for parents to make an educated decision about whether some or all of a PG-rated program may be appropriate for their children. For example, while a given set of parents may not find brief nudity involving buttocks objectionable, that same group of parents may be very adverse to having their children view bare torsos, certain types of violence, or hear particular forms of profanity. Another set of parents may have a completely different set of criteria to determine whether a PG rated movie is acceptable for their children to watch. Further, standard rating systems do not address other potentially objectionable material such as social situations (e.g. discussions of homosexuality), philosophy (e.g. pro-life or pro-choice) or matters of religion.

Furthermore, traditional rating systems only apply to video programming which has been evaluated by some entity empowered to do so. Ratings are not assigned to home videos, some limited distribution video programs sold via mail order, etc.

Current parental control techniques regarding video programming rely either on overall program ratings or the matching of program identification against a database of approved or restricted material. For example, televisions currently being produced include technology known as the "V-Chip", which uses rating information inserted in the broadcast television video programs to determine, based on user supplied information, whether the program is viewable or not. Such rating information is found in line 21 of the vertical blanking interval (VBI) of each field of a frame of the video program. It will be noted that line 21 of the VBI contains closed caption information for standard analog television broadcasts, possibly even in multiple languages, and also extended data services (XDS) packets, i.e., the rating information for a program is stored among other data. This mechanism for transporting data in line 21 of the VBI is described in the ANSI EIA-608 specification, and a summary of VBI line 21 data interpretation can be found in the January 2000 issue of Nuts & Volts. A different specification discusses data encoding for digital video playback and broadcasts.

U.S. Pat. No. 4,930,158 to Vogel discloses a selective video playing system in which a video program on a video tape contains an embedded classification code. That code can then be used to inhibit replay of the video program, under user control. U.S. Pat. No. 4,930,160 to Vogel discloses automatic censorship of video programs, and also involves the use of stored classification codes—either a single code or a group of codes, but with the program coming from either video tape or via broadcast. When a restricted classification code is detected, an alternative video source is automatically switched in. With these devices and methods, as well as the V-chip solution, parents are limited to employing predetermined classifications, which, as previously indicated, may not agree with their particular values.

An alternative approach to parental control has been to try in some fashion to identify a given video program and based on that identification, make a determination whether or not the program should be blocked or be permitted to be viewed. Several techniques for this identification have previously been proposed.

U.S. Pat. No. 4,639,779 to Greenberg discusses a method by which a unique ID is encoded into a video program to allow the program to be automatically identified, while U.S. Pat. No. 4,843,562 to Kenyon identifies video programs by storing a spectragram "fingerprint" of the program into a library, and then using that library to look up future programs via their spectragram to try and find a match. U.S. Pat. No. 5,019,899 to Boles uses a generated digital signature for video information to try and match it to a database.

In contrast, U.S. Pat. No. 5,485,518 combines a video program identification technique with program blocking, by enabling a parent or other user to prevent someone from watching a program which is not in an "approved program" database. So, if the program is not in the database, or if it is in the database but meets certain blocking criteria, its complete viewing would be blocked. The video program identification technique relies on video and audio signal processing.

It should be noted that none of the existing methods implemented in parental control systems permits selective, automatic filtering of only the offending portions out of a video program, but instead merely provides for blocking of entire programs either based on generic, non-specific ratings, or by identifying the program and making a determination whether such program may be viewed.

What is needed is an automatic system capable of evaluating video programs which filters, blocks, or masks portions of the video programs according to user-supplied criteria, in real or substantially real time, i.e., as the video program is playing or being broadcast. What is also needed is a parental control system, which learns the user-supplied criteria. It would be desirable if the parental control system could, for example, filter video programs using criteria appropriate for different groups of viewers.

It should be mentioned at this point that all of the U.S. patents mentioned above are incorporated herein by reference.

SUMMARY OF THE INVENTION

Based on the above and foregoing, it can be appreciated that there presently exists a need in the art for a parental control system which overcomes the above-described deficiencies. The present invention was motivated by a desire to overcome the drawbacks and shortcomings of the presently available technology, and thereby fulfill this need in the art.

The present invention provides an automatic system to evaluate video programs using criteria supplied by a user (a parent, for example) via the multimedia content, e.g. visual, audio, and textual content, of video programs and which then filters, blocks, or masks portions of the video programs according to those criteria, in real time. Such blocking or masking may include simply skipping over the material determined to meet the user specified criteria, substituting an alternate "safe" signal for the duration of the offending program segment, or masking portions of the video or audio content, e.g. blurring a naked body or garbling profanity.

Preferably, the parental control system according to the present invention includes one or more multimedia processors, which analyze incoming visual, audio, and textual content and compare the resultant analysis to specific user-specified or selected criteria. For example, in the visual content one can have expressions (e.g. facial and body), behaviors (e.g. shooting a gun, sexual activity, driving a vehicle), body attributes (e.g. skin tone or shape), violence (e.g. explosions, fighting), etc. In the audio domain one can have sound level (e.g. heavy sound with a lot of low frequency noise for an explosion), verbal expressions (e.g. profanity, slurs, slang, cursing, innuendo), "heavy breathing" sounds (e.g. as might occur during a sex scene), etc. In the textual domain there is semantic content which can include adult language, themes, etc. Raw textual information applied to the textual domain can be extracted from the program in a number of methods. One such method would be the use of speech recognition technology applied to the audio information stream from the program. For television programming, another method to extract the raw textual information would be to use closed caption information. Both methods advantageously could be employed in the same parental control system, either to complement each other and/or provide redundancy.

In one aspect, the present invention provides a method for dynamically filtering the content of a multimedia program in real time on a segment-by-segment basis responsive to a filter criteria, comprising extracting audio, video, and transcript features from segments including the multimedia program, generating a numeric ranking for each filter criteria for each applicable filter category (e.g. violence, nudity, religion, etc.) each of the segments, and when the combined respective numeric rankings for that segment exceeds a threshold, processing that segment to thereby eliminate material corresponding to the filter criteria. Preferably, the filter criteria corresponds to language included in the segment being processed, and the audio portion of the segment is modified during the processing step. Alternatively, the filter criteria corresponds to an image included in the segment being processed, and the video portion of the segment is either modified or skipped during the processing step. In an exemplary embodiment, the numeric ranking is a weighted numeric ranking. In that case, each weighting factor employed in generating the weighted numeric ranking identifies a characteristic such as age or religious affiliation of a respective viewer of the multimedia program. In any event, the numeric ranking for each applicable filter category in each segment is generated by comparing the content of each segment to the filter criteria.

It should be mentioned that, in appropriate cases, i.e., when the combined numeric rankings for proximate ones of the segments each exceed the threshold, the method preferably merges the proximate ones of the segments and any intervening segments to thereby produce a merged segment. In that situation, the processing step permits processing the merged segment to thereby eliminate material corresponding to the filter criteria. Moreover, the filter criteria preferably includes first and second filter criteria, the generating step includes generating first and second numeric rankings for respective first and second filter criteria for each of the segments, the method including the further steps of when the respective first numeric ranking for that segment exceeds a first threshold, processing that segment to thereby eliminate material corresponding to the first filter criteria, when the respective second numeric ranking for that segment exceeds a second threshold, processing that segment to thereby eliminate material corresponding to the second filter criteria.

In another aspect, the present invention provides a parental control system filtering objectionable material from a multimedia program in accordance with a filter criteria. Preferably, the parental control system includes a transcript analysis module extracting first audible features and text from a sequence of segments included in the multimedia program, a visual analysis module extracting video features from the sequence of segments included in the multimedia program, an audio analysis module extracting second audible features from the sequence of segments included in the multimedia program, an analyzer which generates a combined numeric ranking for each of the segments and which generates a respective control signal when the combined numeric ranking exceeds a threshold, and a filter which processes one of the segments of the multimedia program in response to a received respective control signal. The filter either modifies one of the first and second audible features of the respective segment, or modifies the video feature of the respective segment, or eliminates the respective segment from the filtered multimedia program output by the parental control system. Preferably, the parental control system includes a learning module. In that case, selected ones of the first audible features and text extracted by the transcript analysis module, the video features extracted by the visual analysis module, the second audible features extracted by the audio analysis module and user data provided by a controlling user of the parental control system are employed by the learning module to generate the filter criteria. In an exemplar case, the learning module includes a neural network. The parental control system advantageously can be incorporated into a television set, a settop box, or a personal video recorder

BRIEF DESCRIPTION OF THE DRAWINGS

These and various other features and aspects of the present invention will be readily understood with reference to the following detailed description taken in conjunction with the accompanying drawings in which.

DETAILED DESCRIPTION OF THE PREFERRED EMBODIMENTS

In the parental control system and corresponding method according to the present invention, the parental control system, which can be embodied in a television, in a set-top box, or some other type of peripheral, e.g., a personal video recorder (PVR), operates in two related modes of operation. The first mode is a learning mode in which the controlling user (typically a parent or guardian) interacts with the system to configure with examples of the types of video program scenes or segments the controlling user finds objectionable for a selected group of viewers (e.g. small children could be one group, young teenagers another, and grandparents yet another group). In fact, the user might use a selection of extreme examples to train the system coarsely, and then use more discreet examples to fine-tune the training of the system in the learning mode. The second mode of operation of the parental control system and corresponding method is the operational view mode, where the system is filtering the desired video program according to the criteria it has learned about in the learning mode (and/or which shipped with the system or was generically configured with).

Figure 1:
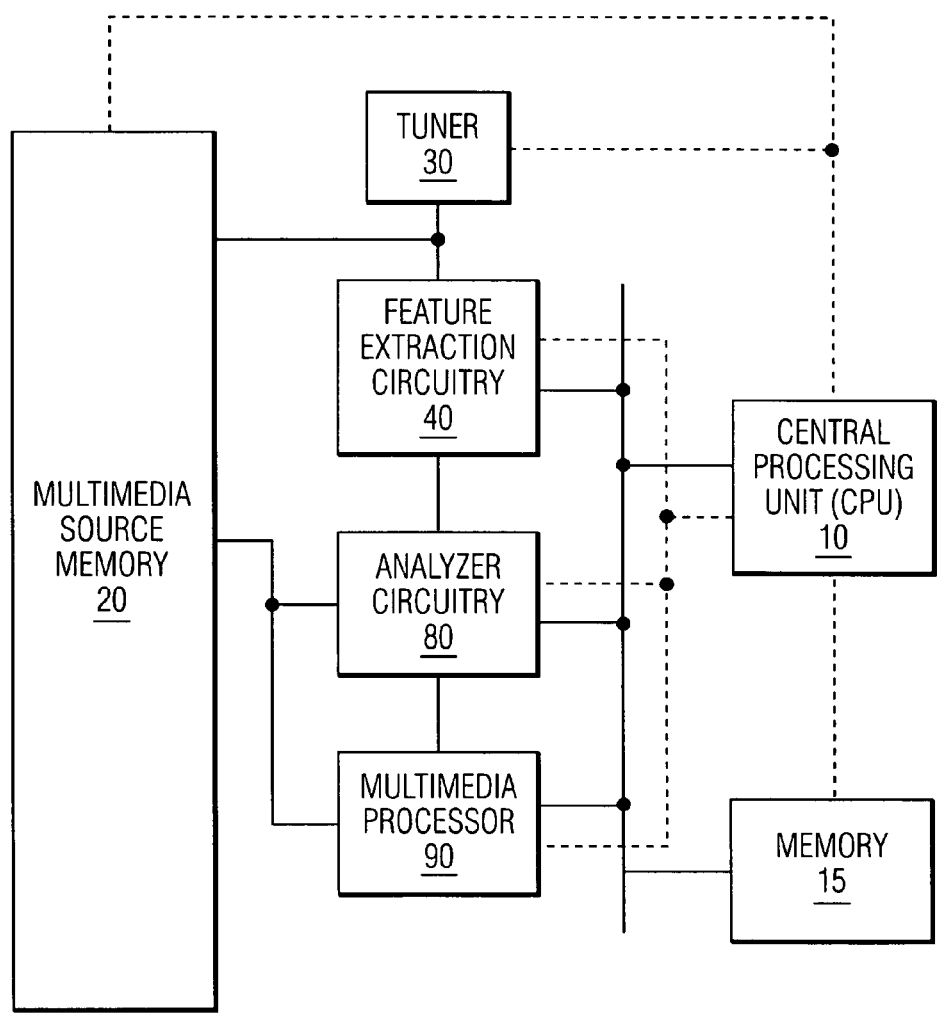
FIG. 1 is a high-level block diagram of a parental control system according to the present invention.

FIG. 1 is a high-level block diagram of a preferred embodiment parental control system according to the present invention, which includes feature extraction circuitry 40, analyzer circuitry 80 and multimedia processor 90. The feature extraction circuitry 40, which will be discussed in greater detail below, receives multimedia content from either tuner 30 or multimedia memory 20. It will be appreciated that multimedia memory 20 is preferably connected to analyzer circuitry 80 and multimedia processor 90, which permits the latter devices to employ multimedia memory 20 as buffer memory. The size of the memory 20 is exaggerated to indicate that the memory 20 could be, in other exemplary embodiments, a memory having sufficient capacity to store many hours of multimedia content. It will be readily understood that having a large memory associated with the parental control system would permit the parental control system to process and filter a program, e.g., a feature length film, so as to obtain a film suitable for presentation to a child. Stated another way, a parental control system equipped or connected to a large multimedia memory would permit the controlling user to filter the original film in a myriad of ways to produce versions of the film suitable for several disparate groups in the user's household.

Still referring to FIG. 1, a central processing unit 10 coupled to a memory 15, which advantageously can include both volatile and non-volatile memory, controls each of the multimedia memory 20, tuner 30, feature extraction circuitry 40, analyzer circuitry 80 and multimedia processor 90. As illustrated in FIG. 1, memory 15 can provide memory storage functions for feature extraction circuitry 40, analyzer circuitry 80 and multimedia processor 90. It should be noted that feature extraction circuitry 40 and analyzer circuitry 80 may themselves be or include separate multimedia processors, and/or dispatch processing functions through multimedia processor 90. Memory 15 advantageously may store software suitable for converting a general purpose device such as a personal video recorder (PVR) equipped with a disk drive and several digital signal processors (DSPs) into a parental control system according to the present invention.

As discussed above, the first mode of operation of the parental control system is a learning mode in which the user interacts with the parental control system to instruct by example, i.e., by providing the parental control system with examples of the types of video program scenes or segments that the controlling user finds objectionable for a selected group of viewers. In an exemplary case, the user might use a selection of extreme examples to train the system coarsely, and then use more discreet examples to fine-tune the training of the system in the learning mode.

Such examples provided by the controlling user (hereafter referred to simply as the "user") would be the realization of filtering criteria established by the user. The parental control system according to the present invention advantageously may be provided with a preprogrammed set of stock segments illustrating a range of criteria—resulting in a "Smart Box" mode of operation. Such stock criteria could be determined regionally (via survey), or according to the ethnic or the religious persuasion of a purchaser, or via any one of a number of different demographics. In one variation on the parental control system and corresponding method, a user could even download a number of categories of criteria into the parental control system from the Internet, either to bypass the user needing to custom configure the parental control system, or in order to provide a better base from which to start custom configuration of the system.

It should be mentioned that the user advantageously can continuously provide the system with input during the learning phase. For example, the user can mark at least one of the audio, visual or textual parts as being objectionable. Preferably, the user provides start and end times, e.g., by marking these times on a timeline showing the video or a timeline enhanced with the keyframes (thumbnail images or the like), or text, or playback of the audio tracks, or combinations thereof. This input can be related to the objectionable categories. In addition, the user can also provide the degree of sensitivity (objectionability), e.g., the section of the timeline containing mildly objectionable material could be identified by single brackets while truly objectionable material could be identified by double brackets.

The parental control system and corresponding method may include at least two existing, but unconfigured categories: violence; and sexual content. The user can create additional categories for anything the user is concerned about others viewing. Such additional categories could include ones based on religious beliefs, personal philosophies, and political affiliation, among others. All categories need to be populated with criteria to help the parental control system and corresponding methods learn the type of things that are objectionable to the controlling user and what category the objectionable material falls into.

In another variation of the parental control system and corresponding method, segment marking and filtering information can come prepackaged as meta data along with the video program, perhaps provided as part of the XDS component of line 21 of the VBI, or via a parallel data feed. The prepackaged segment marking information would apply to standard categories, or could create a category dynamically. The prepackaged segment marking meta data could be standard for the particular program, or could be custom created on the fly by the program provider based on known user preferences and needs. Another method for the detection of objectionable content is by using a palette of templates that are part of a system database and that highlight common objectionable situations. A template could be a video clip with shooting, an intimate scene, a lady with bare chest, etc. These templates are matched to the input video. This could be essential part of the system to help in the "bootstrapping" i.e. initial phase of using the system. In other words the system would have "stereotypical" objectionable scenes that the user can then mark and grade.

As mentioned above, the second mode of operation of the parental control system and corresponding method is the operational view mode, where the system filters the desired video program according to the criteria that the parental control system has learned during the learning mode of operation (and/or which shipped with the system or which the system was generically configured with).

Figure 2:
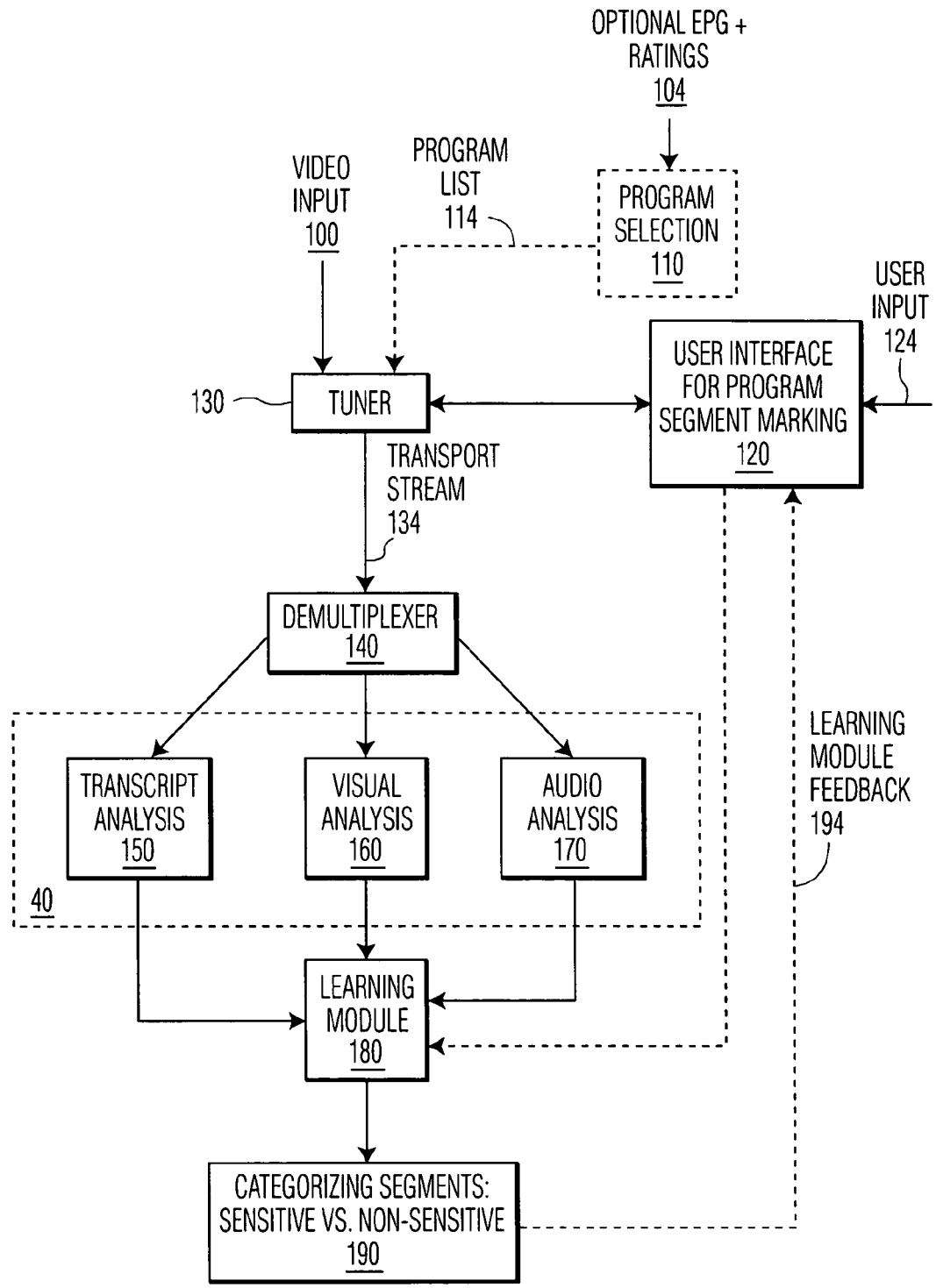
FIG. 2 is a high-level block diagram of the parental control system according to the present invention illustrated in FIG. 1 depicting operation in a learning mode.

In the parental control system and corresponding method, which is illustrated in FIG. 1 and showing in greater detail in FIG. 2, the system consists of three major modules: a feature extraction module, a learning module, and a classification module. The feature extraction and classification modules operate in both the learning mode as well as in the viewing mode, while the learning module is only active during the learning mode of operation. In some exemplary embodiments, however, the learning module may be converted by suitable programming (internal or external) into an analyzer (segmentation and categorization) module, which is discussed below.

Referring to FIG. 2, which depicts the parental control system and corresponding method's operating in the learning mode, the parental control system receives a regular video input 100 stream, which can come from a DVD player, VCR, cable TV feed, satellite, etc., at the input port of video tuner 130 or alternatively video streaming from the Internet. Alternatively, the parental control system can be incorporated into an Internet browser or an e-mail system, i.e., a client software device, since e-mail often includes a Uniform Resource Locator (URL) pointing to a Web site containing objectionable material. Optionally, if the parental control system and corresponding method is enabled to receive program information, as might come from an Electronic Program Guide (EPG), which program information would likely include detailed rating information, the tuner 130 could keep a current copy of the EPG program list 114 on hand, correlating which broadcast program 100 is being viewed via a broadcast channel. Such information would complement or even supplement any rating information, which might be available via the XDS information located on line 21 of the VBI, as used by V-chip technology.

Also integrated with the tuner 130 is input from the user interface 120 used for marking segments by the user. In the parental control system and corresponding method, the user provides input 124 into the user interface 120 via a remote control (not shown) which has buttons to allow for category and viewer group selection, initiating an objection to a segment of the video input, terminating an objection, freezing a frame, and, using cursor keys or a trackball-type input mechanism, selecting the parts of a visual scene which the user finds objectionable, such as a naked body or a gun. It will be appreciated that the same type of mechanism advantageously could be used to highlight objectionable words or phrases in the close captioning information displayed as part of the video input, or in a text output shown by the voice recognition component located in the transcript analysis component 150. For textual input, character strings such as (???), where "???" corresponds to one of the predefined or user-defined categories, might be used in labeling categories, the character strings being entered via an on-screen keyboard such as that displayed with a PVR, e.g., via a TiVo recorder, or a keyboard built into the remote control unit.

Preferably, all marking information, whether for a whole segment, individual frame, or audio selection, is transmitted to the tuner 130, where it, along with the video input information and any optional EPG-related information is carried via the transport stream 134 to the demultiplexer 140.

It is the role of the demultiplexer 140 to split the information from the transport stream into the appropriate parts for the three multimedia components of the feature extraction module, represented by the transcript analysis component 150, the visual analysis component 160, and the audio analysis component 170. Segment marking information relevant to the multimedia component type is passed along to the respective components by the demultiplexer 140. It will be apparent to those of ordinary skill in the art that the demultiplexer 140 may also include a demodulator to split an NTSC or PAL or similar broadcast signal into respective visual and audible information. Further in such case, the demultiplexer 140 would also utilize a frame grabber so that full digitized frames of information can be sent to the visual analysis component 160 of the feature extraction module. If the video input 100 is digital, however, the demultiplexer 140 may have an MPEG-2 or similar decoder in it, and then would pass the digital visual image data directly to the visual analysis component 160 without needing to use a so-called frame grabber or similar component to digitize the video.

In the feature extraction module 40 (composed of the transcript analysis 150, visual analysis 160, and audio analysis 170 components), the audio, visual and transcript parts of the multimedia input are analyzed to "learn" to recognize the objectionable or sensitive segments based on the criteria specified by existing and new user input. Such segments could be parts of news or documentary programs, or action or romantic movies, for example. The sensitive topics normally revolve around violence and sex but, as previously discussed, the user can introduce new categories. The user will label certain segments with appropriate category labels. For example, the system will be able to learn that fast motion scenes with audio effects (special effects for explosions, sound of fighting and hitting) are generally associated with violent scenes. Nude color from visual and moans and groans in the audio domain are normally associated with sex scenes. There are papers in the literature dealing with identifying and/or distinguishing naked body parts in an image. See, for example, D. Forsyth and M. Fleck, "Body Plans" (*Proc. IEEE Conf. on Comput. Vis. and Patt. Recog.*, 1997). Moreover, the user can create a new category, e.g., a lifestyle category, so that the user can instruct the parental control system to learn features of multimedia programs that are deemed unsuitable for some or al members of the user's household.

The transcript analysis component 150 of the feature extraction module preferably is provided with both the audio stream and any close captioning information, along with any segment marking information specified by the user. The audio stream is translated into text via a speech to text speech recognition subsystem, as is known in the art. The output of the speech recognition subsystem can be correlated to the close captioning information to determine if any blatant errors in either exist, possibly requiring greater analysis and evaluation of any language elements in the audio stream. Moreover, when a second audio program (SAP) or bilingual close captioning is available in/for the multimedia program, additional correlations can be made to resolve ambiguities in the transcript analysis component 150 in the feature extraction module 40.

The visual analysis component 160 of the feature extraction module 40 is provided with the digital visual data stream from the demultiplexer 140. The visual analysis component 160 evaluates the incoming digital visual data stream for a broad range of characteristics, including color, texture, objects and object shape, object motion, and scenes.

Low level feature extraction in the video domain includes color (using histograms to map color ranges and popularities), overall motion, and edges. Mid-level features derived from these low-level features include body color and shapes, as well as the visual effects resulting from explosions, objects disintegrating, and gunfire. Ultimately, the features extracted in this component are used to determine whether or not sensitive content exists. For example, color and shape can be used for detection of nudity—different skin tones (for different genotypes) can be detected quite easily in certain color spaces (e.g. HSV) and as such they can be quite meaningful.

As further reference for the technique to implement video data feature analysis, segmentation—and more specifically scene detection—in video data is described in detail in commonly-assigned U.S. Pat. Nos. 6,100,941, 6,137,544, and 6,185,363 B1, of which co-inventor of the current invention, Nevenka Dimitrova, is a joint inventor. Object detection and object motion detection in video data is described extensively in U.S. Pat. No. 5,854,856, of which the other co-inventor of the present invention, Radu S. Jasinschi, is a joint inventor. All of these patents are incorporated herein in their entirety by reference. In addition, description of motion information is also part of the MPEG-7 standard. See, for example, S. Jeannin, R. Jasinschi, A. She, T. Naveen, B. Mory, and A. Tabatabai, "Motion Descriptors For Content-Based Video Representation," (*Signal Processing: Image Communication*, vol. 16, pp. 59-85, 2000).

The audio analysis component 170 of the feature extraction module receives the audio stream from the demultiplexer 140, just like the transcript analysis component 150 does, but processes the stream differently. Low level feature extraction in the audio domain include sound level analysis, LPC, pitch, bandwidth, energy, MFCC (mel cepstral coefficients—used in speech recognition), and Fourier coefficients. Mid-level features derived from low level audio domain features include explosions, objects hitting, object disintegration, heavy breathing, groaning, smacking sounds, and gunfire.

It is important to mention that the "sensitive" segments given to the feature extraction module 40 (i.e. positive examples for the system) should be marked by the user and that the category labels given to these segments are also given by the user, as previously indicated. More specifically, if the user marks a scene from the movie "Terminator" as "violent" then the system will extract all the features from that scene and feed the learning module 180 with each output feature labeled as "violent". Similarly, nude color objects extracted from the visual domain and moans and groans extracted from the audio domain may be labeled as "sexual".

In any event, all features extracted by the three feature extraction components, combined with the current criteria specified for the current video signal (e.g., violent, sexual behavior, etc.) are provided to the learning module 180. The learning module 180 preferably employs standard and well-understood learning paradigms to achieve the proper correlation between the labeling of the video input scene and the extracted features. Standard learning paradigms such as Hidden Markov Models (HMMs), Bayesian networks, genetic algorithms, and neural networks advantageously can be employed in the parental control system and corresponding method, combined with nearest neighbor classification, although one of ordinary skill in the art will appreciate that other learning models, or combinations thereof, may be used as well.

The classification module 190 categorizes segments based on whether they are sensitive or non-sensitive based on the learned categories and the output of the learning module 180. It should be noted that in the parental control system and corresponding method, the user may also want to improve the learning process of the system via the user interface 120 and, therefore, reviews the results of the filtering as output from the classification module 190, and then provides corrections or modifies certain markings, all via the learning module feedback loop 194, back to the learning module 180.

The results of the learning module 180 and classification module 190 are stored in local memory (memory 15 in FIG. 1) in the parental control system. In the parental control system and corresponding method, this would be non-volatile memory.

Figure 3:
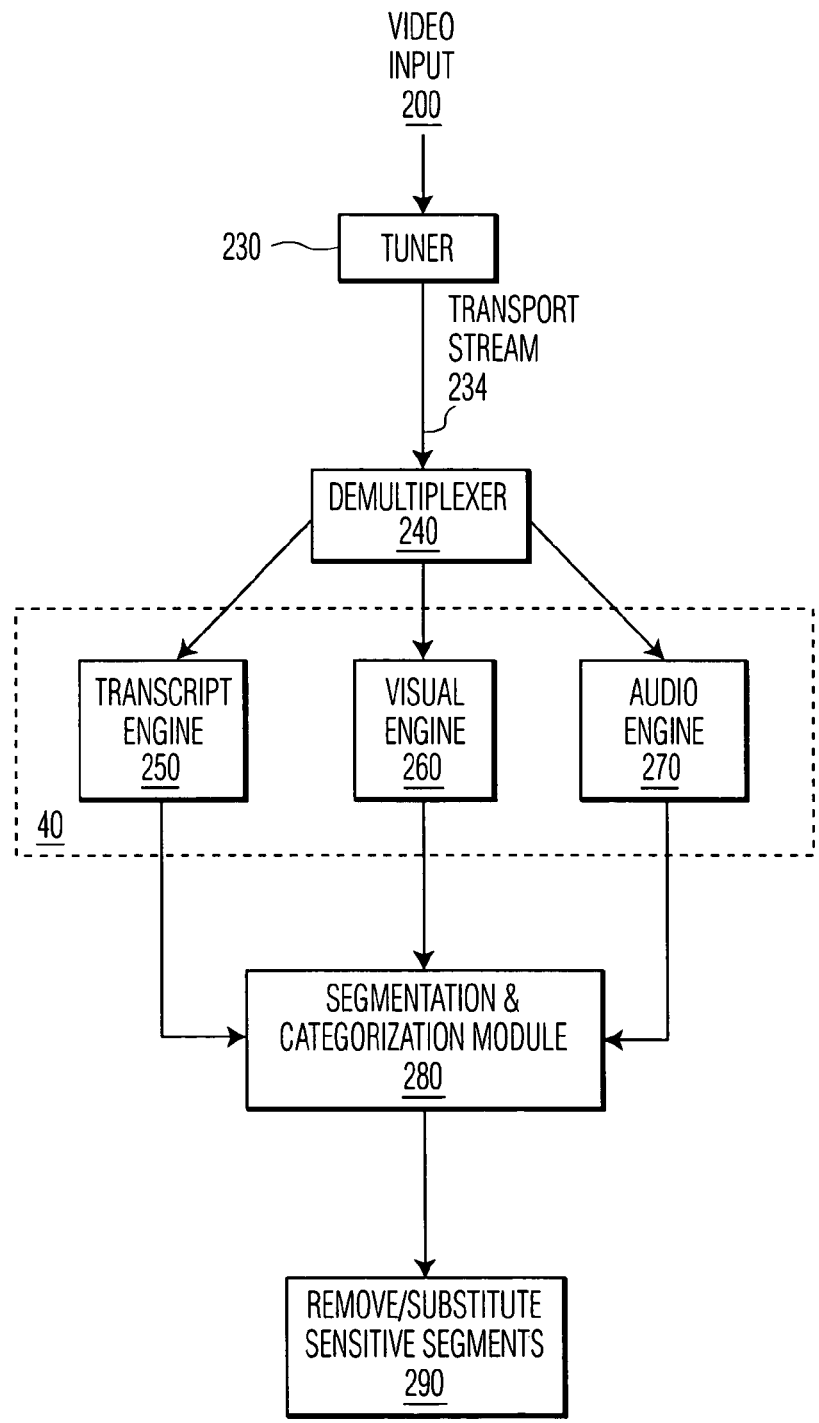
FIG. 3 is a block diagram of the parental control system according to the present invention illustrated in FIG. 1 depicting operation in a viewing mode.

FIG. 3 shows the viewing mode of operation of the parental control system and corresponding method, which has many functions that are analogous to those in found in the parental control system when it is in the learning mode of operation. Video input 200 represents the video feed into the system from another source, e.g. satellite, cable, DVD, VCR, and is fed into tuner 230, and then, along with any other data the tuner 230 may wish to deliver, is passed on via transport stream 234 to demultiplexer 240. It will be appreciated that the multimedia program can also be output from the multimedia memory 20 illustrated in FIG. 1; the output of multimedia memory 20 being the information carried by transport stream 234. From there, in turn, the video input is parceled out to the feature extraction module 40" components, namely the transcript engine 250, the visual engine 260, and the audio engine 270, where the incoming data is analyzed and processed, much in the same way as the same named components in the learning mode of operation function. In fact, the tuner 230, the demultiplexer 240, the transcript engine component 250, the visual engine component 260, and the audio engine component 270 advantageously can be exactly the same processes and system components as the tuner 130, the demultiplexer 140, the transcript engine component 150, the visual engine component 160, and the audio engine component 170, with the only difference in their operation being that user supplied criteria are not being passed along through these components in view (second) mode of operation.

Where some noticeable difference occurs is with the segmentation and categorization module 280, which uses the feature extraction from the three feature extraction components, the transcript engine 250, the visual engine 260, and the audio engine 270, in combination with the previously stored learned criteria, in order to determine whether to tell the filtering module 290 whether to filter the video program during a given segment. In an exemplary embodiment, the learning module 170 advantageously can be converted into the segmentation and categorization module 280, and vice versa, by applying suitable software controls to a general-purpose analyzer.

In any event, the segmentation and categorization module 280 preferably determines the beginning and ending time of sensitive scenes, classifies sensitive scenes and, if necessary, merges scenes that are located proximate to one another. For the latter, this can be accomplished by extending the video signal from the video input 200 briefly, or by buffering the video signal for a period of time, for example. In the parental control system and corresponding method, a buffer large enough to contain 10 seconds of video signal is used; the multimedia memory 20 illustrated in FIG. 1 is a suitable memory.

In terms of segmentation, video input is segmented using cut detection, which is described in greater detail in, for example, in the aforementioned U.S. Pat. No. 6,137,544. For every segment between two cuts, feature extraction is performed as described above. However in the obscure case when the visual segments are longer than n minutes (e.g. n>2 in the parental control system and corresponding method) then the system searches for audio clues to see if the granularity of audio segments is smaller. The smaller of the two is taken. The segments are then fed into the classification module. For each segment, a number representing the likelihood of the segment belonging to one of the sensitive categories is obtained; for multiple active filtering categories, multiple numbers are generated. It should be mentioned that the multimedia memory 20 advantageously can be sized to permit storage of many minutes of multimedia storage; it will be appreciated that adaptation of the parental control system to process segments which may be several minutes in length move the parental control system from the realm of real time processing and viewing into the realm of real time processing and near real time viewing.

Where material is deemed sensitive by the embodiment in multiple categories, a user configurable weighting system advantageously can be employed to bias the results of the filtering option. For example, if the user is configuring the parental control system to accommodate viewing by an older person, e.g., a grandparent, he or she may give more weight to the filtering category for violence (e.g., loud noises and blood make bring back traumatic memories), and less to the sexual content filter category (e.g., the grandparent has likely seen it all before, anyway). However, the user may employ a completely different weighting system for a teenager. When a user-set threshold for the total combined numerical rating is exceeded (including the calculations of all weighted material), the filtering module 290 is notified that it needs to filter the video signal.

However, to simplify the process for the filtering module 290, if the segmentation and categorization module 280 determines that consecutive segments $S_n$ and $S_{n+1}$ have a high likelihood of belonging to the same category, then these segments are preferably merged as a single output segment. It will be appreciated that the output from the segmentation process performed in module 280 is segments with a high likelihood of belonging to a particular sensitive category. Now, if consecutive segments belong to different categories, say "violence" followed by "profanity" then the union of the two segments can be marked for removal. If the system detects small gaps in between segments, say less than one minute, then the gap is also included in the segment for removal.

The filtering module 290, when it receives notification that it should act to remove a segment, makes a determination, based on the segment duration and preset configuration settings, of the optimal method to be employed in filtering the offending content. For example, the module 290 can simply skip the segment, taking advantage of the aforementioned buffer. Alternatively, the filter module 290 advantageously can be configured to substitute another video signal for that segment (e.g., show a Barney the dinosaur interstitial or Web page). Moreover, assuming that the filter module 290 receives definitive information as to what part of a multimedia segment is to be removed, the filter module 290 advantageously can mask or blur out that particular portion. For example, when the audio portion of the segment contains an offensive word or phrase but is otherwise unobjectionable, the user may wish to merely garble the offending word or phrase rather than draw attention to the fact that a portion of the film was excised.

As mentioned above, the parental control system equipped or connected to a large multimedia memory would permit the controlling user to filter the original film in a myriad of ways to produce versions of the film suitable for several disparate groups in the user's household, since the system provides the capability of weighing or scaling the objectionable content so that the controlling user can decide which set of features are allowed under what conditions. For example, assume that there are two children in the house age 7 and 14 and the controlling user has identified different tolerance levels for the same content for each child. In that case, more filters would apply for the 7 year old and than would apply for the 14 year old. Thus, the parental control system can produce multilevel marking for the same movie so that the segments that are marked objectionable for the 14 year old are just a subset of those that are marked for the 7 year old.

It will be appreciated that although the learning phase has been completed and the classification phase has begun, the parental control system advantageously can receive feedback from the controlling user. That is, after the parental control system segments and classifies the movie, the user can be given a chance to review the marked segments and provide feedback to the system, identifying which segments are correctly marked or classified and which are marked incorrectly. It will be appreciated that the next time that the system goes through the learning and classification phases, the system will produce better results.

From the discussion above, it will be appreciated that the parental control system according to the present invention provides the user with the capability of filtering a multimedia, e.g., a video, program based on user specified criteria in real time. Moreover, by merely increasing the size of a buffer memory coupled to other components of the parental control system, the user gains the ability to filter larger segments of the program in near real time. Advantageously, the parental control system according to the present invention provides structure by which a user can edit factory set criteria and/or enter additional criteria, for blocking or filtering of objectionable video program content.

It will also be appreciated that the parental control system according to the present invention advantageously provides a system which learns a user's preferences in terms of what types of content, or portions of that content, the user finds objectionable, and for what type of viewer such criteria are being provided, so that the system can then apply what it has learned in analyzing programs in the future. In an exemplary embodiment, the system is continually learning and fine tuning its behavior based on user input.

The parental control system described above provides circuitry by which features are extracted from the video program to assist the system in both teaching the learning component and in future filtering operations. It will be appreciated that "features" is a comprehensive term including, but not limited to, objects and their qualities from the video portion of the multimedia signal, sounds indicative of particular actions from the audio portion of the multimedia program, language from the audio portion of the multimedia program and/or from the close captioning data being sent along with the video portion of the multimedia program. In short, the parental control system includes a learning module and a filter module. The learning module advantageously can be powered by one or more learning technologies, including Hidden Markov models and/or neural networks, into which criteria including factory set and user-supplied information is fed and combined with feature extraction data from a transcript feature extraction component, a video data feature extraction component, and an audio data feature extraction component. The learning module's resulting knowledge advantageously can be applied to a system filter module, which employs that knowledge to dynamically filter a video program's content according to the specified criteria.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method performed by a device to filter objectionable material, from a multimedia program including plural segments, on a segment-by-segment basis responsive to a filter criteria, comprising:
   providing a learning module to generate the filter criteria learned based on user instructions by examples of objectionable content;
   splitting the multimedia program into plural components;
   extracting audio, video, and transcript features from segments within the plural components;
   processing each segment amongst the segments, according to the learned filter criteria generated by the learning module and the extracted features, and generating a numeric ranking corresponding to the filter criteria learned based on the user instructions by examples of objectionable content and applied to the segment; and
   when the respective numeric ranking for the segment exceeds a threshold, processing the segment to thereby eliminate material corresponding to the learned filter criteria.

2. The method as recited in claim 1, wherein:
   the filter criteria corresponds to language included in the segment being processed; and
   the audio portion of the segment is modified during the processing step.

3. The method as recited in claim 1, wherein:
   the filter criteria corresponds to an image included in the segment being processed; and
   the video portion of the segment is modified during the processing step.

4. The method as recited in claim 1, wherein:
   the filter criteria corresponds to an image included in the segment being processed; and
   the entire segment is skipped during the processing step.

5. The method as recited in claim 1, wherein the numeric ranking is a weighted numeric ranking.

6. The method as recited in claim 5, wherein each weighting factor employed in generating the weighted numeric ranking identifies a characteristic of a respective viewer of the multimedia program.

7. The method as recited in claim 1, wherein the numeric ranking for each segment is generated by comparing the content of each segment to the filter criteria.

8. The method as recited in claim 1, further comprising:
   when the numeric rankings for proximate ones of the segments each exceed the threshold, merging the proximate ones of the segments and any intervening segments to thereby produce a merged segment; and
   wherein the processing step comprises processing the merged segment to thereby eliminate material corresponding to the filter criteria.

9. The method as recited in claim 1, wherein:
   the filter criteria comprises first and second filter criteria;
   the generating step comprises generating first and second numeric rankings for respective first and second filter criteria for each of the segments;
   the method further comprising the steps of:
   when the respective first numeric ranking for the segment exceeds a first threshold, processing the segment to thereby eliminate material corresponding to the first filter criteria;
   when the respective second numeric ranking for the segment exceeds a second threshold, processing the segment to thereby eliminate material corresponding to the second filter criteria.

10. The method recited in claim 9, wherein the first filter criteria is associated with a first passive user and wherein the second filter criteria is associated with a second passive user.

11. The method as recited in claim 10, wherein:
   the first filter criteria comprises a first set of filter criteria;
   the second filter criteria comprises a second set of filter criteria; and
   the first set of filter criteria is a subset of the second set of filter criteria.

12. The method as recited in claim 1, further comprising:
   providing training segments having content indicated by the user to be objectionable; and
   learning, by the learning module from the training segments, to identify objectionable content matching the filter criteria,
   wherein the learning step is performed by the electronic device.

13. The method as recited m claim 12, wherein the device comprises a software device.

14. The method as recited in claim 12, further comprising the steps of:
   reviewing results generated during performance of the extracting and generating steps; and
   providing feedback to the device corresponding to a review of the results by a controlling user.

15. A parental control system for an electronic device to filter objectionable material from a multimedia program including plural segments, comprising:
   a learning module to generate filter criteria learned based on user instructions by examples of objectionable content;
   a splitting mechanism that splits the multimedia program into plural components;
   a transcript analysis module that extracts first audible features and text from a transcript analysis component within the plural components;
   a visual analysis module that extracts video features from a visual analysis component within the plural components;
   an audio analysis module that extracts second audible features from an audio analysis component within the plural components;
   an analyzer which processes each segment amongst the segments, according to the learned filter criteria generated by the learning module and the extracted features, and generates a numeric ranking corresponding to the filter criteria learned based on the user instructions by examples of objectionable content and applied to the segment, and which generates a respective control signal when the numeric ranking exceeds a threshold; and
   a filter, which processes one of the segments of the multimedia program in response to a received respective control signal.

16. The parental control system as recited in claim 15, wherein the filter modifies one of the first and second audible features of the respective segment.

17. The parental control system as recited in claim 15, wherein the filter modifies the video feature of the respective segment.

18. The parental control system as recited in claim 15, wherein the filter eliminates the respective segment from the filtered multimedia program output by the parental control system.

19. The parental control system as recited in claim 15, wherein:
  numeric ranking is a weighted numeric ranking;
  the analyzer employs a weight factor in generating the weighted numeric factor; and
  the weighting factor corresponds to a characteristic of the intended viewer of the multimedia program.

20. The parental control system as recited in claim 19, wherein the weighting factor is selectable from a plurality of weighting factors.

21. The parental control system as recited in claim 15, wherein selected ones of the first audible features and text extracted by the transcript analysis module, the video features extracted by the visual analysis module, the second audible features extracted by the audio analysis module and user data provided by a controlling user of the parental control system are employed by the learning module to generate the filter criteria.

22. The parental control system as recited in claim 21, wherein the learning module comprises a neural network.

23. The parental control system as recited in claim 21, wherein the learning module instantiates a genetic algorithm.

24. A television set incorporating the parental control system as cited in claim 15.

25. A settop box incorporating the parental control system as recited in claim 15.

26. A personal video recorder incorporating the parental control system as recited in claim 15.

27. A client software device incorporating the parental control system as recited in claim 15.

28. A device for eliminating objectionable material from a multimedia program, the device comprising:
  a learning module to generate filter criteria learned based on user instructions by examples of objectionable content;
  circuitry configured to extract at least one of audio, video and text features from the multimedia program;
  circuitry configured to process each segment amongst the segments, according to the learned filter criteria generated by the learning module and the extracted features, and generate a numeric ranking corresponding to the filter criteria learned based on the user instructions by examples of objectionable content and applied to the segment; and
  circuitry configured to eliminate, in accordance with the numeric ranking, objectionable material from the multimedia program on a segment-by-segment basis.

29. The device of claim 28, where the circuitry configured to extract at least one of audio, video and text features is configured to extract at least two types of features selected from the set of audio features, video features or text features.

30. The device of claim 28, where the circuitry configured to extract at least one of audio, video and text features is configured to extract each of audio features, video features and text features from the multimedia program.

31. The device of claim 28, where the circuitry configured to extract at least one of audio, video and text features is configured to identify demarcation between plural segments predefined in the multimedia program.

32. The device of claim 28, further comprising circuitry configured to identify demarcation between plural segments in the multimedia program.

33. The device of claim 28, wherein the learning module learns the filter criteria based on training segments having content indicated by the user to be objectionable.

34. The device of claim 33, where the learning module includes circuitry configured to store predefined parameters and to permit user-modification of the predefined parameters.

35. The device of claim 34, where the device includes a cursor mechanism to permit user identification of image regions, and where the learning module is to permit user-modification of the predefined parameters based on identified image regions.

36. The device of claim 28, where the circuitry configured to extract at least one of audio, video and text features is configured to separate multiple components from the multimedia program, as is further configured to extract at least two types of features from the set of audio features, video features or text features.

37. The device of claim 36, where, for each of plural segments:
  the circuitry configured to extract at least one of audio, video and text features is configured to extract at least two types of features from the set of audio features, video features or text features, for each segment of the multimedia program;
  the circuitry configured to process each segment is configured to compare for each segment the extracted feature(s) to criteria; and
  the circuitry configured to eliminate the objectionable material from the multimedia program, configured to eliminate the objectionable material on a segment-by-segment basis.

38. A device for filtering material from a multimedia program, comprising:
  a learning module to generate filter criteria learned based on user instructions by examples of objectionable content;
  at least two of a visual analysis module to extract image features;
  an audio analysis module to extract second verbal audible features;
  a transcript analysis module to extract text features based on a transcript;
  and
  a filter to process the multimedia program, according to the extracted features and the titter criteria generated by the learning module, and generate a numeric ranking corresponding to the filter criteria learned based on the user instructions by examples of objectionable content and applied to a portion of the multimedia program, and eliminate, in accordance with the numeric ranking, objectionable material from the multimedia program.

39. The device of claim 38, further comprising a splitting mechanism to split the multimedia program into a plurality of multimedia components.

40. The device of claim 38, where the device comprises each of:
  a visual analysis module to extract image features represented by the multimedia components;
  an audio analysis module to extract verbal audible features from an audio analysis component within the multimedia components; and
  a transcript analysis module to extract text features represented by at least one of the multimedia components, based on a transcript.

41. The device of claim 38, embodied in a set top box.

42. The device of claim 38, embodied in a television set.

43. The device of claim 38, wherein the learning module learns the filter criteria based on training segments having content indicated by the user to be objectionable.

44. The device of claim 43, where the learning module includes circuitry configured to store predefined parameters and to permit user-modification of the predefined parameters.

45. The device of claim 44, where the device further includes a cursor mechanism to permit user to identify regions, and where the learning module is to permit user modification of the predefined parameters based on regions identified using the cursor mechanism.

46. The device of claim 38, further comprising circuitry configured to separate multiple components from the multimedia program, the device being configured to extract from the component respective features from the set of audio features, video features or text features.

47. The device of claim 38, where the multimedia program has plural segments, and where:
the at least two of a visual analysis module, an audio analysis module and a transcript analysis module are configured to extract respective features from the set of audio features, video features or text features, for each segment of the multimedia program;
and
the filter is to eliminate the objectionable material on a segment-by-segment basis.

48. A device for tittering material from a multimedia program, comprising:
a learning module to generate filter criteria learned based on user instructions by examples of objectionable content;
for each one of plural components of the multimedia program, each comprising plural segments, a mechanism to extract, on a segment-by-segment basis, at least one of image features, verbal audible features, and text features;
and
a filter to process each segment amongst the segments, according to the extracted features and the learned filter criteria generated by the learning module, and generate a numeric ranking corresponding to the filter criteria learned based on user instructions by examples of objectionable content and applied to the segment, and eliminate objectionable material in accordance with the numeric ranking on a segment-by-segment basis.

49. A device to eliminate objectionable material from a multimedia program having plural segments, comprising:
a learning module to generate filter criteria learned based on user instructions by examples of objectionable content;
means for extracting at least two of audio, video, or transcript features from respective multimedia components; and
means for processing each segment amongst the segments, according to the learned filter criteria generated by the learning module and the extracted features, and generating a numeric ranking corresponding to the filter criteria learned based on the user instructions by examples of objectionable content and applied to the segment, and eliminating objectionable material, in accordance with the numeric ranking, on a segment-by-segment basis.

50. A device for eliminating objectionable material from a multimedia program, the device comprising:
a learning module to generate filter criteria learned based on user instructions by examples of objectionable content;
circuitry configured to extract at least one of audio, video and text features from the multimedia program; and
circuitry configured to process the multimedia program, according to the extracted features and the learned filter criteria generated by the learning module, and generate a numeric ranking corresponding to the filter criteria learned based on the user instructions by examples of objectionable content and applied to a portion of the multimedia program, and eliminate, in accordance with the numeric ranking, objectionable material from the multimedia program.

* * * * *